2 Sheets—Sheet 1.
R. BALL.
COTTON-SEED PLANTER.
No. 189,174.　　　　　　　　Patented April 3, 1877.
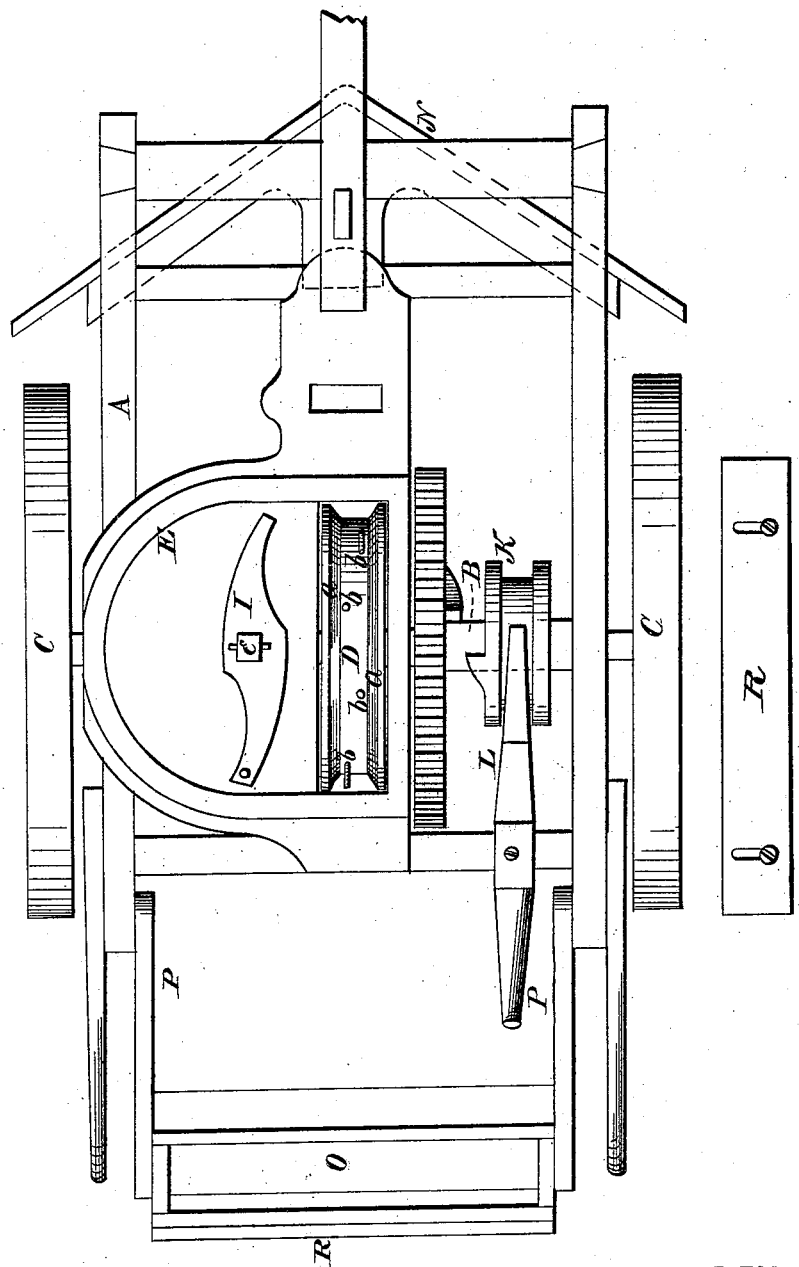
WITNESSES
INVENTOR
Richard Ball
Alexander Mason
ATTORNEYS 2 Sheets—Sheet 2.
R. BALL.
COTTON-SEED PLANTER.
No. 189,174. Patented April 3, 1877.
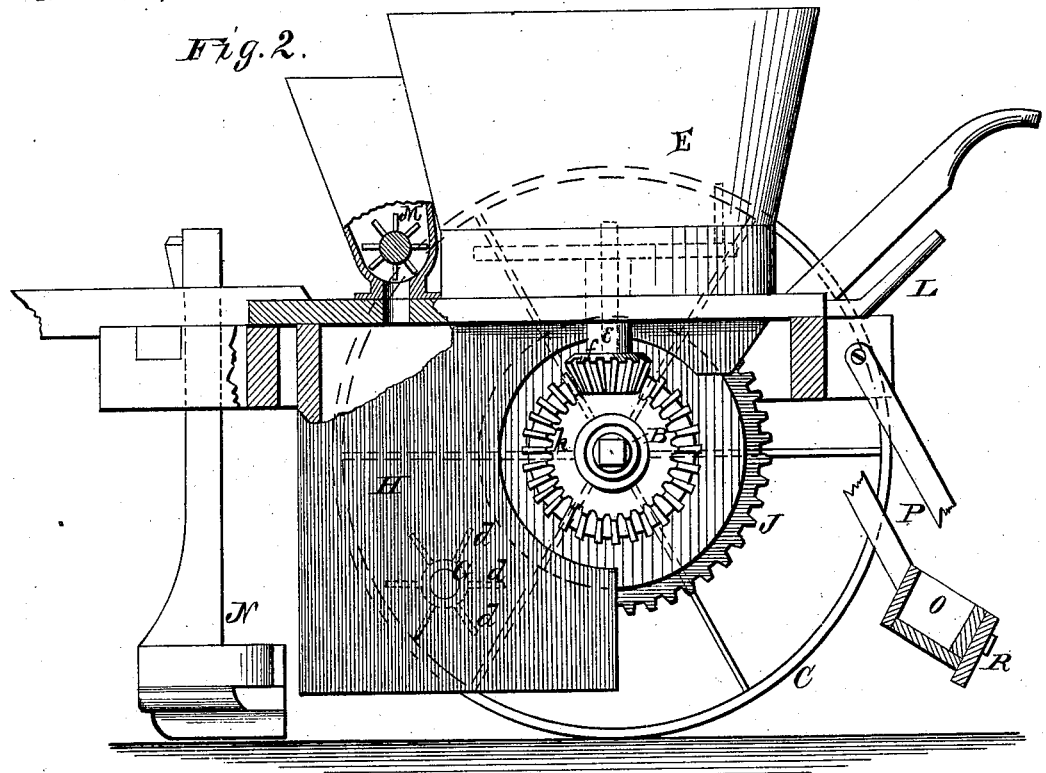
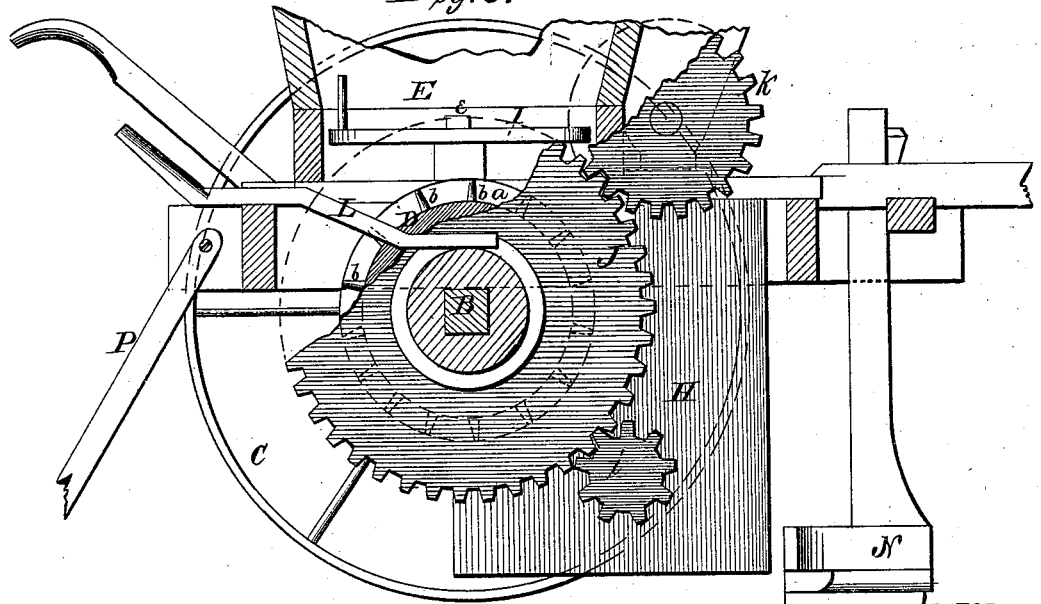
WITNESSES
Franck L. Ourand
C. L. Emit.
INVENTOR
Richard Ball
Alexander & Mason
ATTORNEYS

UNITED STATES PATENT OFFICE.

RICHARD BALL, OF PETERSBURG, VIRGINIA, ASSIGNOR TO WM. H. TAPPEY AND ALEXANDER STEEL, OF SAME PLACE.

IMPROVEMENT IN COTTON-SEED PLANTERS.

Specification forming part of Letters Patent No. 189,174, dated April 3, 1877; application filed October 31, 1876.

*To all whom it may concern:*

Be it known that I, RICHARD BALL, of Petersburg, in the county of Dinwiddie, and in the State of Virginia, have invented certain new and useful Improvements in Cotton Seed Planter; and do hereby declare that the following is a full, clear, and exact description thereof, reference being had to the accompanying drawings, and to the letters of reference marked thereon, making a part of this specification.

My invention relates to cotton-seed planters; and has for its object to insure a positive and regular discharge of seed from the hopper, and to deliver them into the row in a regular or uniform quantity free from clods and vacancies, which has heretofore been difficult, owing to the tendency of the seed to cling together in clods, because of the fiber remaining on them.

To this end the nature of my invention consists in the construction and arrangement of certain parts of a cotton-seed planter, as will be hereinafter more fully described and pointed out by the claims.

In order to enable others skilled in the art to which my invention appertains to make and use the same, I will now proceed to describe its construction and operation, referring to the annexed drawings, in which—

Figure 1 is a plan view of a cotton-seed planter embodying my invention. Fig. 2 is a side elevation, and Fig. 3 a longitudinal section, of the same.

A represents the frame of a cotton-seed planter mounted on the axle B, upon which the driving-wheels C C are placed.

D represents a wheel placed loosely on the axle B, immediately below the hopper E. This wheel may be considered as a cylinder having a flange, a, of greater diameter at each end, and is provided with pins or bars b, projecting out from its surface, thus forming a trough or series of boxes, which receive the seed from the hopper and conveys them to the scatterer as the wheel revolves.

The scatterer G is composed of a short shaft, passing through the casing or conductor H, and is provided with a series of arms, d, which, revolving rapidly, knock the clods of seed—which fall from the wheel—to pieces before they reach the ground.

Immediate over the bottom of the hopper is a horizontally-rotating agitator, I, which revolves in the same direction as the wheel D, and forces the seed into the same. This agitator is secured to an upright shaft, e, connected by a bevel-wheel, f, to a beveled cogged rim, h, on the side of the wheel D. This wheel D is also provided with a large cog-wheel, J, as shown, and is thrown in and out of gear with the axle by means of a clutch, K, operated by a lever, L. The wheel J meshes with pinions i and k, for communicating motion to the scatterer G and guano-distributer M, respectively.

In front of the machine is an opener, N, of ordinary construction, and in rear of the machine is the coverer, composed of a box, O, attached to hinged or pivoted arms P P, and provided on its rear side with a movable and adjustable bar, R, which may at any time be changed in form, thus obviating the necessity of changing or making anew the whole coverer.

When the machine is drawn forward, the clutch K being engaged, the wheel D will revolve, carrying with it the seed, which has fallen into the groove or boxes in its face until they drop onto the scatterer G d, which, revolving rapidly, knocks the lumps or clods to pieces, causing a continual shower of loose seed, uniform in quantity and free from clods.

The filling of the groove or boxes in the wheel D is assisted by the agitator I, which, revolving in the same direction, forces the seed into the groove of the wheel.

The scatterer G d serves not only for breaking the clods of seed, as described, but in like manner to break any in the fertilizer, which also falls on the scatterer.

Having thus fully described my invention, what I claim as new, and desire to secure by Letters Patent, is—

1. The revolving wheel or cylinder D, provided with flanges a and pins or bars b, projecting from its surface between said flanges, as described, for taking the seed from the hopper, as set forth.

2. The horizontally-rotating agitator I, in combination with the wheel or cylinder D, as and for the purposes herein set forth.

3. The combination of the pivoted drag-bars P P, the weight-box O, and the movable and adjustable bar R, substantially as and for the purposes herein set forth.

In testimony that I claim the foregoing I have hereunto set my hand this 18th day of October, 1876.

RICHARD BALL.

Witnesses:
WM. C. LUMSDEN,
R. I. STEEL.